US007946488B2

(12) United States Patent
Paquier

(10) Patent No.: US 7,946,488 B2
(45) Date of Patent: May 24, 2011

(54) GLAZING COMPRISING A MARKING ELEMENT, GLAZING IDENTIFICATION METHOD AND IDENTIFICATION SYSTEM THEREOF

(75) Inventor: Michel Paquier, Thourotte (FR)

(73) Assignee: Saint-Gobain Glass France, Courbevoie (FR)

( * ) Notice: Subject to any disclaimer, the term of this patent is extended or adjusted under 35 U.S.C. 154(b) by 928 days.

(21) Appl. No.: 10/593,253

(22) PCT Filed: Apr. 7, 2005

(86) PCT No.: PCT/FR2005/050215

§ 371 (c)(1),
(2), (4) Date: Sep. 18, 2006

(87) PCT Pub. No.: WO2005/103430

PCT Pub. Date: Nov. 3, 2005

(65) Prior Publication Data

US 2007/0199255 A1 Aug. 30, 2007

(30) Foreign Application Priority Data

Apr. 14, 2004 (FR) ..................................... 04 03866

(51) Int. Cl.
*G06K 7/00* (2006.01)

(52) U.S. Cl. ......... 235/435; 235/375; 235/385; 235/454

(58) Field of Classification Search .................. 235/487, 235/488; 340/942
See application file for complete search history.

(56) References Cited

U.S. PATENT DOCUMENTS 3,654,438 A * 4/1972 Wyatt et al. ..................... 235/84
4,048,918 A * 9/1977 Peck ............................. 101/114
5,557,092 A * 9/1996 Ackley et al. ............ 235/462.07
5,734,343 A 3/1998 Urbish
7,332,202 B2 * 2/2008 Demars et al. .................. 428/34
2003/0047538 A1 * 3/2003 Trpkovski ....................... 216/84

FOREIGN PATENT DOCUMENTS

| | | | |
|---|---|---|---|
| DE | 42 01 894 | | 7/1993 |
| DE | 44 06 969 | | 9/1994 |
| DE | 195 33 855 | | 4/1997 |
| WO | 00 36261 | | 6/2000 |
| WO | WO 03/040507 | * | 5/2003 |

OTHER PUBLICATIONS

Andersen Reference: No Author, “Introduction”, Jul. 2005, Andersen Windows, all pages.*
www.andersenwindows.com Reference: No author, “Double-hung Windows Average Unit Performance”, 1996, Andersen Windows, all pages.*
www.andersenwindows.com Screen Captures, Mar. 2004. all pages.*
Federal Regulation 16 CFR1201, 1980, all pages.*
IGCC Procedural Guide, Aug. 2009, all pages.*
Andersen Parts Catalog from Mar. 24, 2004, all pages.*

* cited by examiner

*Primary Examiner* — Thien M. Le
*Assistant Examiner* — Christopher Stanford
(74) *Attorney, Agent, or Firm* — Oblon, Spivak, McClelland, Maier & Neustadt, L.L.P.

(57) ABSTRACT

A glazing unit including at least one marking element visible from the outside thereof and including a string of characters. The marking element can be visually identified by whomsoever and can be communicated remotely to an identification device. The identification device incorporates, for a given marking element, characteristics relating to the glazing unit that are intended to be at least partly accessible to the public in exchange for the identity of the marking element.

24 Claims, 2 Drawing Sheets

GLAZING COMPRISING A MARKING ELEMENT, GLAZING IDENTIFICATION METHOD AND IDENTIFICATION SYSTEM THEREOF

BACKGROUND OF THE INVENTION

I. Field of the Invention

The invention relates to glazing units equipped with at least one visible marking element.

II. Description of Related Art

The manufacturer's mark which is affixed to the glass of the glazing unit by various known techniques such as printing or etching is, of course, known by way of a marking element.

As far as multiple glazed units such as double glazing units which comprise an interlayer at the periphery of the glazing unit in order to space apart two sheets of glass between which a gas-filled cavity is enclosed are concerned, it is known practice for a marking element of the certification type, CE marking for Europe for example, or CEKAL marking for France, to be positioned on this interlayer facing the gas-filled cavity. This marking element makes it possible in particular to identify the manufacturing method used, the date of manufacture and the manufacturing unit.

In order to allow the user of the glazing unit to check, upon taking delivery, that the product is indeed the one expected in terms of the level of thermal insulation, acoustic insulation, protection and safety performance, labeling is provided in the form of a self-adhesive label affixed to the glazing unit. However, when the glazing unit is mounted, this label is removed for esthetic reasons and to ensure an optimum field of vision.

The marking element and the labeling are therefore intended to provide certain characteristics relating to the glazing unit in order in particular to guarantee the quality of the glazing unit.

However, because of the lack of space, for example on the interlayer of an insulating glazing unit, or for reasons of esthetics or field of vision in the case of any kind of glazing unit, it cannot be envisaged for a multitude of marking elements corresponding respectively to a multitude of technical characteristics associated with the glazing unit and/or with its manufacture to be inscribed.

However, the end-user of the glazing unit is becoming increasingly demanding in terms of knowing all of the characteristics of a product. In the case of a glazing unit these are, aside from the performance aspects mentioned hereinabove, the precise dimensions of the glazing unit, the thickness of the sheets of glass, the thickness of the gas-filled cavity, the type of gas, the type of glass, the type of coatings deposited on the glass to give the glazing unit its various functionalities (antireflection, ultraviolet reflection, infrared reflection, self-cleaning, coloration, thermochromic, . . . ), etc.

It could nonetheless be envisaged for all these characteristics to be written down on the label. However, once the label has been removed, there is a risk that this information will be mislaid. In addition, if the product is sold on, the new purchaser will certainly then no longer have access to this information and it would be very difficult, if not impossible, for him to trace right back to the manufacturer.

Finally, in the case of a glazing unit that needs to be changed for an identical one including therefore all its technical characteristics, and of whose origin the user is unaware, this user will not be able to have his requirements met.

BRIEF SUMMARY OF THE INVENTION

It is therefore an object of the invention to provide a glazing unit of which all the technical characteristics that make it up, and that relate to its manufacture, and possibly are associated with its destination, that the manufacturer agrees to communicate, can be accessible to the user by virtue of permanent means of identification.

According to the invention, the glazing unit comprising at least one marking element visible from the outside thereof and consisting of a string of characters, is characterized in that the marking element can be visually identified by whomsoever and is intended to be communicated remotely to identification means, said identification means incorporating, for a given marking element, characteristics relating to the glazing unit which are intended to be at least partly accessible to the public in exchange for the identity of the marking element.

Visible is to be understood as meaning that which can be seen in light from the visible part of the spectrum, and of necessity by the human eye.

Visible from (the) outside is to be understood as meaning that which can be seen on a glazing unit regardless of the mounting and/or position of the glazing unit.

Visually identifiable by whomsoever is to be understood as meaning that which can be read and/or reproduced verbally or graphically by an individual adopting an intellectual approach. Thus, a barcode, for which each bar or collection of bars signifies nothing per se to the individual is excluded from the invention by way of marking element.

Characteristics relating to the glazing unit is to be understood as meaning all the information associated with the glazing unit: its technical characteristics, its manufacturing characteristics, the characteristics associated with its destination, its commercial characteristics etc.

Publicly is to be understood as meaning any individual; thus, the information is not reserved simply for those directly involved in the manufacture of the glazing unit or involved in fitting it into the end-product. Indeed, it is, for example, known that electronic chips or barcodes affixed to the glazing unit, and which incidentally do not constitute the marking element of the invention, can be used to determine information that is of use on the manufacturing line and/or assembly line of the glazing unit, but this information is reserved solely for this purpose, the public not having access to it.

Thus, anybody wishing to know information about the glazing unit they have in their possession may, by recognizing the marking element, identify this information, it not being possible for this information to be inscribed on the glazing unit because it takes up too much space or would be esthetically unattractive if it had all to be inscribed.

The benefit of the invention is therefore that of being able to render publicly accessible, that is to say accessible to whomsoever rather than just to the manufacturer, a collection of characteristics relating to the glazing unit, and for this to be the case throughout the life of the glazing unit. Furthermore, even after the glazing unit has been replaced or destroyed, if the marking element has been recognized beforehand, it is possible to identify all the characteristics of the glazing unit and therefore make sure that it is recycled appropriately according to the materials of which it is made.

According to one feature, the string of characters is a combination of numerals and/or of letters or of pictorial symbols.

According to another feature, the marking element is intended to be recognized by recognition means, such as character-recognition reader equipment.

According to another feature, the marking element is communicated to the identification means by appropriate technical communications means.

Advantageously, the identification means consist of a database in which all the characteristics relating to the glazing unit are recorded in the form of a string of numbers, termed the identifier, each number being coded on one or more successive characters of the marking element. As the marking element is generated when the manufacturing unit takes the order for the glazing units, the identifier is therefore unique and specific to each line of the order processed by a manufacturing unit.

As a preference, the characters of the marking element are a numeric or alphanumeric or binary or decimal or alternatively hexadecimal coding of a number in the identifier.

According to yet another feature, the marking element or the identifier in the identification means remains unchanged while the corresponding characteristics associated with the glazing unit can be altered.

Advantageously, the marking element is affixed in perpetuity to the glazing unit, that is to say such that it cannot be degraded, or removed unless, of course, the glazing unit is destroyed. Thus, the support for the marking element will not, for example, consist of a label secured to an external and accessible surface of the glazing unit.

Thus, the marking element is advantageously secured to a part of the glazing unit that is inaccessible from the outside.

The glazing unit may comprise the same marking element arranged at several points on the said glazing unit. The marking element is, for example, engraved or printed onto an element that makes up the glazing unit.

The identity of the marking element will involve not only supplying data that is compulsory in respect of the certifications and standards in force, but also supplying any other data that the manufacturer deems useful in guaranteeing the quality of the product, detailing the technical characteristics of the product, and identifying the customer references.

Thus, the marking element identifies the technical characteristics that make up the glazing unit, the characteristics relating to its manufacture, the commercial characteristics and those associated with its destination.

By way of non-exhaustive examples, the marking element identifies at least one of the following characteristics:

- the commercial name of the glazing unit, and/or the family of glazing unit, and/or the type of glazing unit;
- the composition of the glass in the glazing unit and/or the technical characteristics afforded by the thin layers deposited on the glazing unit;
- the dimensions of the glazing unit;
- the place of manufacture of the glazing unit and/or the date of manufacture of the glazing unit;
- the first customer of the glazing unit;
- information associated with the first use of the glazing unit;
- the type of certification and/or of standards that the glazing unit meets;
- pecuniary information associated with the glazing unit.

The glazing unit may be of the insulating type and comprise at least two sheets of glass and at least one gas-filled cavity separating the two sheets of glass, the spacing of the two sheets of glass being achieved by at least one interlayer. The marking element is then advantageously arranged on the interlayer and more particularly on the face facing the gas-filled cavity. Also, the marking element identifies the characteristics of the gas-filled cavity, particularly its thickness, and its composition, and/or identifies the technical characteristics of the interlayer.

The glazing unit may also be laminated and comprise at least two sheets of glass and a plastic interlayer arranged between the two sheets of glass, the marking element being affixed, for example, to the plastic interlayer.

Another object of the invention is a method for identifying a glazing unit comprising at least one marking element visible from the outside of this glazing unit and intended to be visually identifiable by whomsoever, the method consisting in recognizing the marking element, characterized in that, after recognition of the marking element, the method consists in transmitting the content of the marking element to identification means which identify it with an item of information, and in passing on at least some of this information publicly.

According to one feature, the recognition of the marking element is performed by visual reading or electronic reading.

According to another feature, the transmission of the content of the marking element to the identification means may be performed in various ways: by mail, via telephone line in a verbal or voice communication, in a written communication such as a telefax, a message appearing on any type of display screen (television, computer), via the Internet, or using any other known communications means.

According to yet another feature, the passing-on of the information consists in listing the data supplied publicly. This data is passed on by any known type of communications means, such as verbally by telephone, in writing by mail, or telefax, or by sending a message by telephone or Internet, or by displaying on an Internet site, or alternatively by displaying on any display screen connected to a communications network.

The invention also relates to a system for identifying a glazing unit using a marking element affixed to the glazing unit and able to be identified from outside the glazing unit, this system being characterized in that it comprises transmission means for transmitting the recognition of the marking element to identification means, identification means which receive the marking element, the said marking element corresponding to information intended to be rendered at least partially public, and forwarding means for passing on the information corresponding to the marking element from the identification means to reception means.

According to one feature, with the marking element visible from outside the glazing unit, the system comprises recognition means for recognizing the marking element able to read the marking element, such as a reader device of the character recognition equipment type.

Advantageously, the system comprises at least one filter associated with the identification means so as to pass on only some of the information corresponding to the marking element.

According to another feature, the transmission means and the forwarding means of the system are mail or telephone, or telefax, or electronic communications means of the Internet type.

According to yet another feature, the reception means are a recording or viewing device.

According to the method or system for identifying the glazing unit of the invention, the information corresponding to a marking element and contained in the identification means includes the technical characteristics that make up the glazing unit, the characteristics relating to its manufacture, the commercial characteristics and those associated with its destination.

The information is recorded in a computer-oriented manner in the form of a string of numbers, termed the identifier, each number being coded on one or more successive characters of the marking element. As a preference, according to the method or system of identification, the marking element is a string of characters which corresponds to a binary or hexadecimal coding of a number in the identifier.

The identifying of the glazing unit by whomsoever presents numerous advantages both for the initial customer of the manufacturing establishment (the distributor, the joiner, the renderer, etc.) and for the end-customer, or alternatively for the ulterior user after the end-customer after several years of life of the product.

Also, it is possible by virtue of this marking element, to identify all the characteristics of the product and to manufacture one identical to it at any point in its life, even several years after it was manufactured.

Any new reproduction also does not necessarily need to be performed at the original manufacturing site, because this marking element allows any other works to obtain all the information needed to manufacture the glazing unit.

Furthermore, a private individual wishing to replace his glazing unit may, without having to travel, easily communicate the contents of the marking element of his glazing unit to the joiner who, in turn, without having to travel, can identify the characteristics of the glazing unit and order a new one.

Finally, the manufacturer may, in the event of a fault with a series of glazing units, easily inform the customer base through the media, for example, by communicating the marking element which can then be recognized by the customer who will then be able to identify the defective glazing unit.

BRIEF DESCRIPTION OF THE DRAWINGS

Other features and advantages of the invention will become apparent in the description which follows, with reference to the attached drawings in which.

DETAILED DESCRIPTION OF THE INVENTION

Figure 1:
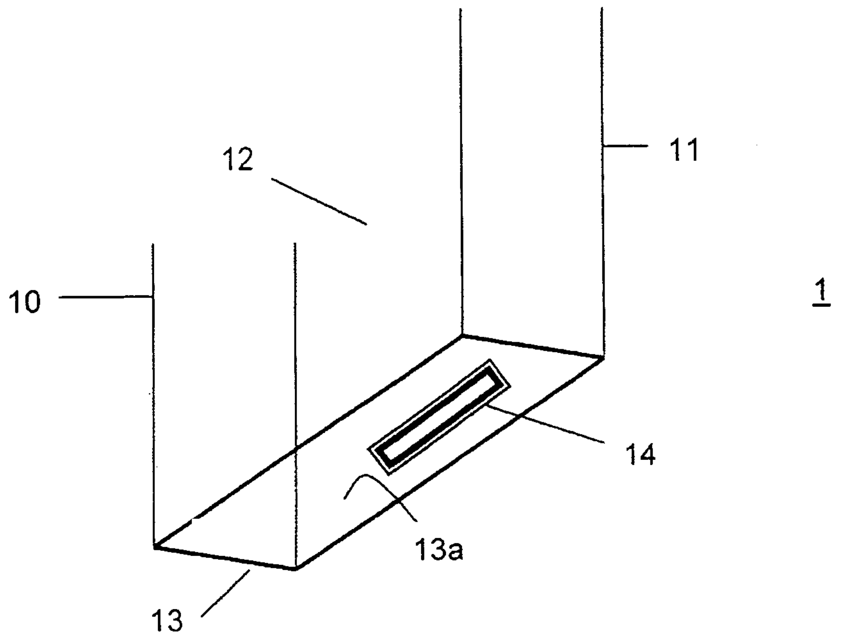
FIG. 1 is a partial side view of an insulating glazing unit.

FIG. 1 illustrates by way of example of a glazing unit according to the invention an insulating glazing unit 1 comprising two sheets of glass 10 and 11, and a gas-filled cavity 12 separating them. The two sheets of glass are spaced apart by the gas-filled cavity by means of an interlayer 13 which is arranged around their periphery.

The interlayer 13 comprises, on the face 13*a* facing the gas-filled cavity, in order to be visible, a marking element 14.

The marking element 14 is intended to be in perpetuity. To this end, according to the type of glazing unit, the choice of the location and the choice of the manner of affixing of the marking element 14 will be optimized in order to avoid any possible degradation.

Thus, depending on the type of support on which the marking element 14 is affixed, this element may be engraved or alternatively printed (using a screen printing technique, stamps, etc.) using an ink suited to the type of support.

In the case of the insulating glazing unit 9, the marking element 14 is preferably arranged on the interlayer so as not to be degraded, and facing the gas-filled cavity in order to be visible.

In the case of some other type of glazing unit, engraving may be preferred by way of affixing means.

In the case of a laminated glazing unit, the choice may for example be to print the marking element on the plastic interlayer sheet.

This marking element 14 is therefore intended to be recognized and identified by whomsoever so as, through suitable means, to formulate a collection of characteristics relating to the glazing unit, it not being possible for all of these characteristics to be inscribed on the glazing unit.

Figure 3:
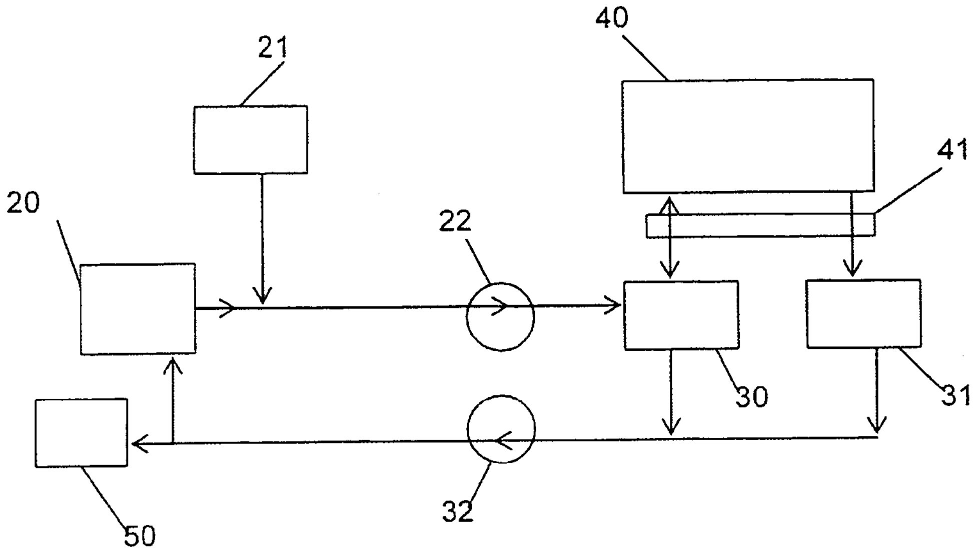
FIG. 3 is a diagram of the method of identifying the glazing unit according to the invention.

FIG. 3 illustrates the method of identifying the glazing unit by recognition of the marking element 14.

The marking element 14 is therefore visible so that it can be recognized by any suitable recognition means. It can be read visually by any individual 20 or by any suitable reader device 21 (character recognition equipment for example).

In order to determine all of the characteristics relating to the glazing unit, all that is required, having read the marking element 14, is to transmit its contents (the question) to reception means 30 which are connected to identification means 40 comprising, for example, a database.

The reception means 30 could also be an operator such as a physical person, just as they could be a suitable reception device (voice recording device, software, etc.). They transmit the question to the database 40.

The database 40 transcribes the characters from the marking element 14 into an explicit list of information and communicates this list (the answer) to the reception means 30 or to other connecting means 31 which pass it on to the individual 20 or to a recording device or appropriate display device 50.

The transmitting of the question and the passing-on of the answer may be performed by various suitable respective technical communications means 22 and 32, such as mail or telephone or electronic communications means of the Internet type.

Thus, the individual 20, having read the expression may, for example, telephone the question to an operator who constitutes the reception means 30. This operator, having access to the database 40, then in response communicates the answer relating to the characteristics of the product.

The transmission of the question may also be done by telephone, via not a physical person but a voice box and/or using the keys of the telephone.

Electronic means such as the Internet or an SMS-type telephone message or a telefax message may, of course, be used to communicate the expression of the marking element to the reception means 30.

This communication may just as easily be done by sending a simple piece of mail.

The answer consists in listing the characteristics relating to the product. This transmission by the means 32 may be done verbally by telephone, or by mail, or by telefax, or by sending an electronic message by telephone or Internet, or alternatively by displaying on an Internet site.

The collection of communications means 22 and 32 and the recognition means 21 and the reception means 30 given here by way of examples are entirely non-limiting, and other technical means may be envisaged.

The database 40 has, in its memory, an item of information which collates all the technical characteristics of the glazing unit, its manufacturing characteristics, the characteristics associated with its destination, etc. The marking element 14 corresponds to this information.

The marking element 14 is restricted to a certain number of characters, for example about ten, for space reasons, and to make the reading easier to understand and easier to transmit without error when, for example, it is read by an individual.

These characters are advantageously one or more combinations of numerals and letters which correspond for example to numeric and hexadecimal codings intended to be understood in a computerized manner at the input to the database 40. These numerical and hexadecimal codings represent a string of numbers in the database, termed the identifier, which represents an item of information. The information contains all the characteristics relating to the glazing unit.

Any other type of coding may be used, such as alphanumeric, or binary, or alternatively decimal, coding.

It should be noted that the use of hexadecimal coding in computer language advantageously allows numbers to be coded on fewer characters than they can be with numerical coding. This is why hexadecimal coding will be preferred in order to use fewer characters so that the marking element takes up less space.

The identifier is given at the time of manufacture of the glazing unit and remains constant.

Some non-exhaustive examples of characteristics relating to the glazing unit are given hereinafter:

commercial name of the glazing unit; family of the glazing unit, type of glazing unit;

dimensions of the glazing unit;

type of glass, glass thickness;

types of layers with their functionalities;

in the case of an insulating glazing unit: the type of interlayer and thickness of the interlayer, the type of mastic, type of gas;

esthetic elements relating to the glazing unit (glazing bars, color of glazing bars, etc.);

CEKAL text, description relating to certifications and standards;

number of glazing units ordered;

selling price;

name of initial customer, specific information requested by the initial customer (name of the model of window in which the glazing unit will be mounted, name of the building for which the glazing unit is intended, types of care products to be used on the window), etc.

This marking element 14, the identity of which is in an independent database, for example, database 40, has the advantage of being able, for this same marking element 14, to add to the database 40 any additional information subsequent to the manufacture of the glazing unit. For example, if the glazing unit already at the time of manufacture meets specifications which have not yet been covered by standards but which later become so, the manufacturer will easily be able to add to the database this standards information relating to the standards that the glazing unit meets, the marking element 14 remaining the same.

Finally, it should be noted that answer filters 41 are preferably associated with the database 40. These filters select which information to communicate according to the origin of the question. Thus, a manufacturing plant may have access to all of the characteristics, whereas the initial customer will have access to a more limited list.

The invention claimed is:

1. A system for identifying a glazing unit using a marking element affixed to the glazing unit and identifiable from outside the glazing unit, the system comprising:

an identification device including a computer database, the identification device receiving a recognition of the marking element and identifying one or more hexadecimal numbers from a string of characters of the marking element, the string of characters containing one or more substrings of successive characters where at least one of the one or more substrings is encoded as a hexadecimal number with a base of 16;

the identification device correlating the one or more hexadecimal numbers to information in the computer database by relating the one or more hexadecimal numbers to a string of numbers of an identifier representing the information, each of the one or more hexadecimal numbers of the at least one marking element comprising a hexadecimal coding of a number of the string of numbers of the identifier, the information including characteristics unique to the glazing unit on which the marking element is visible and being at least partially publically renderable; and a second technical communication device that passes on the information in the computer database that corresponds to the marking element from the identification device to a reception device.

2. The system for identifying a glazing unit as claimed in claim 1, wherein the string of characters includes at least one of numerals, letters, or pictorial symbols.

3. The system for identifying a glazing unit as claimed in claim 1, wherein an identity of the marking element is recognizable by a character-recognition reader equipment.

4. The system for identifying a glazing unit as claimed in claim 1, further comprising a first technical communication device that transmits the recognition of the marking element to the identification device.

5. The system for identifying a glazing unit as claimed in claim 1, wherein the marking element and the identifier remain unchanged while corresponding characteristics associated with the glazing unit can be altered.

6. The system for identifying a glazing unit as claimed in claim 1, wherein the marking element is affixed in perpetuity to the glazing unit, or is secured to a part of the glazing unit that is inaccessible from the outside.

7. The system for identifying a glazing unit as claimed in claim 1, comprising the same marking element arranged at a plurality of points on the glazing unit.

8. The system for identifying a glazing unit as claimed in claim 1, wherein the marking element identifies the characteristics unique to the glazing unit, the characteristics being technical characteristics that make up the glazing unit, characteristics relating to the manufacture of the glazing unit, commercial characteristics of the glazing unit, and characteristics associated with a destination of the glazing unit.

9. The system for identifying a glazing unit as claimed in claim 1, wherein the marking element identifies at least one of the following characteristics:

a commercial name of the glazing unit;

a family of the glazing unit;

a type of the glazing unit;

a composition of glass in the glazing unit;

technical characteristics afforded by thin layers deposited on the glazing unit;

dimensions of the glazing unit;

a place of manufacture of the glazing unit;

a date of manufacture of the glazing unit;

a first customer of the glazing unit;

information associated with a first use of the glazing unit;

a type of certification;

standards that the glazing unit meets; or pecuniary information associated with the glazing unit.

10. The system for identifying a glazing unit as claimed in claim 1, wherein the glazing unit is an insulating unit and comprises at least two sheets of glass and at least one gas-filled cavity separating the two sheets of glass, a spacing of the two sheets of glass being achieved by at least one interlayer, and wherein the marking element is arranged on the at least one interlayer or on a face facing the gas-filled cavity.

11. The system for identifying a glazing unit as claimed in claim 10, wherein the characteristics identified by the marking element include a thickness of the gas-filled cavity, composition of the gas-filled cavity, and technical characteristics of the interlayer.

12. The system for identifying a glazing unit as claimed in claim 10, wherein the at least one marking element is arranged on a face of the at least one interlayer facing the gas-filled cavity.

13. The system for identifying a glazing unit as claimed in claim 1, wherein the marking element is engraved or printed onto an element that comprises the glazing unit.

14. The system for identifying a glazing unit as claimed in claim 1, wherein the glazing unit is laminated and comprises at least two sheets of glass and a plastic interlayer arranged between the two sheets of glass, the marking element being affixed to the plastic interlayer.

15. The system for identifying a glazing unit as claimed in claim 1, wherein, with the marking element visible from outside the glazing unit, the system further comprises an electronic reader that recognizes the marking element and that reads the marking element.

16. The system for identifying a glazing unit as claimed in claim 1, further comprising at least one database filter associated with the identification device so as to pass on only some of the information corresponding to the marking element.

17. The system for identifying a glazing unit as claimed in claim 4, wherein the first technical communication device and the second technical communication device include utilizing mail, telephone, telefax, electronic communications, or Internet.

18. The system for identifying a glazing unit as claimed in claim 1, wherein the reception device includes a recording or viewing device.

19. A method for identifying a glazing unit including at least one marking element visible from outside of the glazing unit and visually identifiable by whomsoever, the method comprising:

recognizing the at least one marking element;

after the recognizing, transmitting a content of the at least one marking element via a first technical communication device to an identification device including a computer database;

identifying via the identification device one or more hexadecimal numbers from a string of characters of the at least one marking element, the string of characters containing one or more substrings of successive characters where at least one of the one or more substrings is encoded as a hexadecimal number with a base of 16;

correlating via the computer database the one or more hexadecimal numbers with an item of information in the computer database, the item of information including characteristics unique to the glazing unit on which the marking element is visible, the correlating including relating the one or more hexadecimal numbers to a string of numbers of an identifier representing the item of information, each of the one or more hexadecimal numbers of the at least one marking element comprising a hexadecimal coding of a number of the string of numbers of the identifier; and passing-on at least some of the item of information publicly via a second technical communication device.

20. The method as claimed in claim 19, wherein the recognizing of the at least one marking element is performed by electronic reading.

21. The method as claimed in claim 19, wherein the transmitting of the content of the at least one marking element to the identification device is performed by mail, by telephone, by telefax, by electronic communications, or by Internet.

22. The method as claimed in claim 19, wherein the passing-on of at least some of the item of information publicly via a second technical communication device includes by telephone, in writing by mail, by telefax, by sending a message by telephone or Internet, by displaying on an Internet site, or by displaying on any display screen connected to a communications network.

23. The method for identifying the glazing unit as claimed in claim 19, wherein the information corresponding to the at least one marking element and contained in the computer database of the identification device includes technical characteristics that make up the glazing unit, characteristics relating to manufacture of the glazing unit, commercial characteristics of the glazing unit, and characteristics associated with a destination of the glazing unit.

24. The method for identifying the glazing unit as claimed in claim 19, wherein the information is recorded in the computer database of the identification device in a computer-oriented manner in a form of the string of numbers of the identifier.

* * * * *

UNITED STATES PATENT AND TRADEMARK OFFICE

CERTIFICATE OF CORRECTION

PATENT NO. : 7,946,488 B2
APPLICATION NO. : 10/593253
DATED : May 24, 2011
INVENTOR(S) : Michel Paquier It is certified that error appears in the above-identified patent and that said Letters Patent is hereby corrected as shown below:

In column 5, between lines 42 and 43, insert the paragraph

Figure 2:
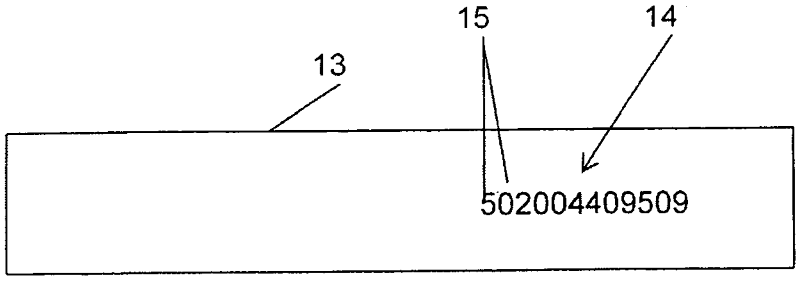
FIG. 2 is an enlarged view of part of FIG. 1.

-- The marking element 14, as illustrated in Figure 2 which is an enlarged view of the interlayer 13, is a string of characters 15 which corresponds, for example, to a combination of numerals and/or letters or pictorial symbols. The type of writing used for the characters may depend on the country for which the glazing unit is intended so that the user can decipher the marking element more easily. --.

Signed and Sealed this
Sixth Day of September, 2011

David J. Kappos
*Director of the United States Patent and Trademark Office*